United States Patent [19]
Calvani et al.

[11] Patent Number: 5,479,082
[45] Date of Patent: Dec. 26, 1995

[54] DEVICE FOR EXTRACTION AND RE-INSERTION OF AN OPTICAL CARRIER IN OPTICAL COMMUNICATIONS NETWORKS

[75] Inventors: Riccardo Calvani, Pino Torinese; Emilio Vezzoni, Turin, both of Italy

[73] Assignee: Cselt-Centro Studi e Laboratorti Telecommunicazioni S.p.A., Turin, Italy

[21] Appl. No.: 271,115

[22] Filed: Jul. 6, 1994

[30] Foreign Application Priority Data

Aug. 10, 1993 [IT] Italy .................................. TO93A0602

[51] Int. Cl.⁶ ................................................ H04J 14/02
[52] U.S. Cl. .......................... 359/127; 359/119; 359/125; 385/24; 385/39
[58] Field of Search ..................... 359/114, 119, 359/124–125, 127, 137, 154, 173; 385/39, 15, 24

[56] References Cited

U.S. PATENT DOCUMENTS

| | | | |
|---|---|---|---|
| 5,231,529 | 7/1993 | Kaede | 359/124 |
| 5,280,549 | 1/1994 | Barnard et al. | 359/114 |
| 5,307,195 | 4/1994 | Nicole | 359/173 |

FOREIGN PATENT DOCUMENTS

0361368  4/1990  European Pat. Off. .

OTHER PUBLICATIONS

Oda et al., 'An Optical FDM–Add/Drop Multiplexing Ring Network Utilizing Fiber Fabry–Perot Filters and Optical Circulators' IEEE Photonics Technology Letters, vol. 5, No. 7, Jul. 1993, pp. 825–828.

Electronics Letter, vol. 29, No. 10, 13 May 1993 Stevenage GB, pp. 905–907, XP 000367666 M. Fukutoku et al; "Wavelength–Division–Multiplexing Add/Drop Multiplexer Employing A Novel Polarisation Independent . . . ".

IEEE Photonics Technology Letters, vol. 5, No. 7, Jul. 1993 New York US, pp. 825–828, XP 000394492 K. Oda et al; 'An Optical FDM–Add/Drop Multiplexing Ring Network Utilizing Fiber Fabry–Perot Filters and Optical . . . '.

Transactions of the Institute of Electronics and Communication Engineers of Japan, Section E, vol. E72, No. 10, Oct. 1989 Tokyo JP, pp. 1086–1088, XP 000074437 M. Koga et al, 'Multi/Demultiplexer Using A 4–Port . . . '.

*Primary Examiner*—Leo H. Boudreau
*Assistant Examiner*—Kinfe-Michael Negash
*Attorney, Agent, or Firm*—Herbert Dubno

[57] ABSTRACT

The device includes a first optical circulator connected in series with the line (1e, 1u) in order to receive a signal stream including a carrier to be extracted, modulated by an information signal, and to transmit a signal stream including the same carrier, re-inserted into the stream after having being modulated with another information signal, and a second optical circulator connected to local information processing means, to which it supplies the extracted carrier and from which it receives the carrier to be re-inserted. Between the two circulators there is an optical-fibre bandpass filter that can be tuned to the carrier wavelength.

4 Claims, 2 Drawing Sheets

DEVICE FOR EXTRACTION AND RE-INSERTION OF AN OPTICAL CARRIER IN OPTICAL COMMUNICATIONS NETWORKS

FIELD OF THE INVENTION

The present invention relates to optical communications networks and ,more particularly to a device for extraction from an optical signal stream of a carrier, modulated by an information signal, and re-insertion into the stream of another carrier at the same wavelength, modulated by a different information signal.

BACKGROUND OF THE INVENTION

Devices of this type can be used for example in wavelength-division multiplexing communications networks, for extraction from the line of information for a certain user and re-insertion in the line of information generated by the same user. Indeed, in such networks information is usually broadcast and selected, i.e., information from each user is broadcast to all others, and each user, in order to extract information of concern to him, must select a certain wavelength from the set of wavelengths present on the line. Another application is found for example in the routing nodes of reconfigurable optical networks, to re-route certain information streams due to changed conditions in the traffic or to by-pass a fault downstream from a node.

For the implementation of devices of this type, the use of tunable acousto-optical passband fitters based on TE/TM polarization converters has been proposed. Examples of these are found in the papers "A fully transparent fiber-optic ring architecture for WDM networks", by M. I. Irshid and M. Kavehrad (Journal of Lightwave Technology, Vol. 10, No. 1, January 1992, pages 101–108) and "Wavelength-division-multiplexing add/drop multiplexer employing a novel polarisation independent acousto-optical tunable filter" (Electronics Letters, Vol. 29, No. 10, May 13, 1993, pages 905–907).

In particular, the device described in the latter paper is a two-input, two-output device including a pair of optical circulators, one of them being connected to the line and the other to a local processing device, and a polarizing beam splitter-recombiner and a TE/TM acousto-optical converter connected between the two circulators. The two ports of the converter are connected to the circulators through respective sections of polarization maintaining optical fibers, one of which rotates by 90° the polarization of the beam traversing it. The radiation in the line, usually elliptically polarized, is transferred from the first circulator to the splitter-recombiner, that splits it into two beams with orthogonal polarization. The beam with TE polarization is reflected and sent to one of the ports of the converter; the beam with TM polarization, which is transmitted, goes into the fiber section which rotates by 90° its polarization, thus likewise arriving with TE polarization at the other port of the converter. The two beams traverse the converter in opposite directions. If the wavelength of the two beams is one of those the filter is tuned to, the beams leave the filter with TM polarization and are again sent to the splitter-recombiner. The beam traversing the fiber section which rotates the polarization reaches the splitter-recombiner with TE polarization and is reflected back towards the second circulator; the other beam maintains its TM polarisation and is transmitted towards the second circulator. The recombined beam is then sent to the local processing device. For any other wavelength, the polarization state of the two beams is left unchanged by the filter and the two beams are again sent from the splitter to the first circulator, so that the recombined beam is re-inserted into the line. Similarly, a radiation introduced through the second circulator is transferred to the line through the first circulator if its wavelength is one of those the filter is tuned to.

The known device allows extraction and re-insertion of several carriers at the same time; however, it has a few limitations. Its main shortcoming is the low selectivity of tunable acousto-optical converters, which can only separate wavelengths if these are at least a few nanometers apart, thus limiting the system capacity relative to the available bandwidth. Another shortcoming is that the device can introduce selective attenuation of the two field polarization components, so that the polarization of the output signal may differ from that of the input signal. Moreover, acousto-optical polarisation converters are not easily found on the market.

OBJECTS OF THE INVENTION

It is an object of the invention to provide a device that only uses components that are easily found on the market and have much greater selectivity than an acousto-optical converter, so that it can also be used in wavelength-division systems having very closely spaced channels.

Moreover it is an object to provide a device which operates independently of polarization because each of its components will be polarization-independent.

SUMMARY OF THE INVENTION

The device according to the invention includes:

- at least a first three-port optical circulator, having an input port connected to a line on which an optical signal stream is present that includes the carrier or a carrier to be extracted, and an output port connected to a line which carries an optical signal stream that includes the carrier or a carrier re-inserted;
- at least a second three-port optical circulator, having an input port connected to means to generate the carrier or a carrier to be re-inserted and an output port connected to means to receive the carrier or a carrier extracted; and
- at least one optical bandpass filter, connected between an input-output port of the first circulator and an input-output port of the second circulator by said optical filter being the optical filter is finely wavelength-tunable filter capable of transmitting the wavelength corresponding to the passband and reflecting all other wavelengths, so that the carrier or a carrier to be extracted is transferred from the first to the second circulator and the carrier or a carrier to be re-inserted is transferred from the second the first circulator, while letting carriers at other wavelengths to pass from the input port to the output port of the circulators.

Advantageously, the filter is a resonant cavity optical fiber filter, associated with means to adjust the cavity length for wavelength tuning.

BRIEF DESCRIPTION OF THE DRAWING

The present invention will be made clearer with reference to the following annexed drawing, in which.

SPECIFIC DESCRIPTION

Figure 1:
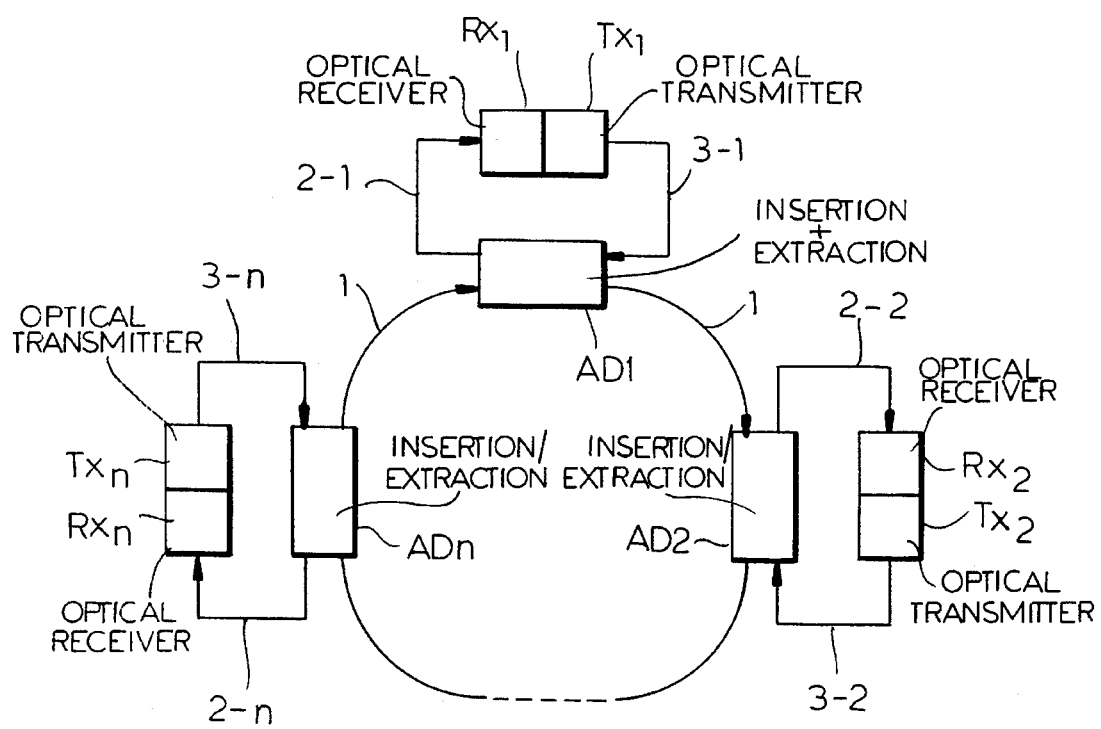
FIG. 1 is a block diagram which shows an example of optical communication network using the invention.

FIG. 1 shows an optical fiber communications network made up by a certain number of nodes, $n_1, n_2 \ldots n_n$ connected by a ring transmission line 1, carrying a wavelength-division multiplexed information stream that includes several carriers respectively at wavelengths $\lambda_1, \lambda_2 \ldots \lambda_n$, assumed for simplicity to be as many as the nodes.

Again for simplicity of description the ring is assumed to have only one fiber.

Each node includes a device ADi (i=1, 2 . . . n) for extraction from line 1 of the information meant for the node and for insertion onto line 1 of the information generated by the node, as well as means for local processing of information, namely an optical transmitter $Tx_i$ that sends along the line a carrier at wavelength $\lambda_i$, and one or more optical receivers, shown in the whole at $Rx_i$. The device ADi, which is the subject matter of the invention, must be capable of inserting onto the line the carrier $\lambda_i$ generated by $Tx_i$ and provide receivers $Rx_i$ with any of the carriers available in the line, including carrier $\lambda_i$ since, as is usual in ring communication systems, each node must cancel the information it generates after such information has gone around the ring. References 2–1, 3–1 . . . 2–n, 3–n denote optical fiber sections connecting respective devices AD to transmitter Tx and receivers Rx.

Figure 2:
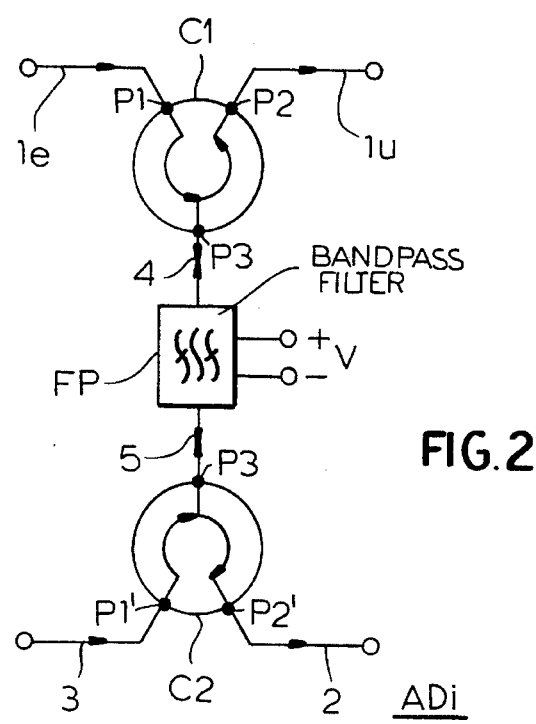
FIG. 2 is a diagram which depicts the device according to the invention, for extraction and re-insertion of one carrier at a time.

FIG. 2 shows the structure of one of the devices ADi in the simplest case in which the same carrier must be inserted onto and extracted from the line. The device includes an input circulator C1 and an output circulator C2, implemented in micro-optics, and a band pass filter FP tuned to the wavelength of interest.

Circulators C1, C2 are three-port elements. One-way ports P1, P2 of C1 are respectively connected to the input branch 1e and to the output branch 1u of line 1, and are an input and an output of device AD; two-way port P3, is connected to a fiber section 4 allowing signal transfer from circulator C1 to filter FP and vice-versa. Similarly, ports P1', P2' (one-way) and P3' (two-way) of C2 are connected to fibre sections 2, 3 and to a further fiber section 5 allowing signal transfer from circulator C2 to filter FP and vice-versa.

The bandpass filter FP is a high wavelength selectivity, low attenuation filter, which must transmit the wavelength corresponding to the passband and reflect all other wavelengths. For example, it can be a Fabry-Perot cavity resonator, with a mirror at the termination of one of the fibers 4, 5 and another on the surface of an element associated with the other fiber, said element having a size comparable to that of the cavity and practically the same refractive index as the fibre core. A voltage-controlled piezoelectric device associated with the element shifts it so as to vary the cavity length and thus tune the filter. The structure of a tunable Fabry-Perot filter is described for instance in the paper "A field-worthy, high performance tunable fiber Fabry-Perot filter", submitted at the Conference ECOC '90, 16–20 Sep. 1990, Amsterdam. Both the circulators and the tunable Fabry-Perot resonators are commercially available components.

It can immediately be seen that the device described actually extracts and re-inserts an optical carrier. Indeed, a Fabry-Perot cavity, as it is well known, transmits a radiation at the wavelength it is tuned to and reflects radiation at all other wavelengths, provided they are sufficiently spaced apart from the tuning wavelength. Therefore, the various carriers present on branch 1e of the line pass to the fiber section 4 through ponds P1, P3 of circulator C1. The filter FP is transparent to the carrier at wavelength $\lambda$, which proceeds to fiber 5 and then to the appropriate receiver $Rx_i$; all other wavelengths are reflected by FP and proceed to the output branch 1u of the line through ports P3, P2 of C1. Similarly, a carrier at the wavelength generated by $Tx_i$ and present at the input 3 of C2 can traverse the filter FP in the opposite direction and be inserted into the wavelength-division multiplex at the output 1u of the device along the path: ports P1', P3' of C2, fiber 5, FP, fibre 4, ports P3, P2 of C1.

For extraction or insertion of another carrier, it suffices to vary control voltage V so as to vary the wavelength the filter is tuned to.

Should the device be used to re-route information at a routing node of the network, rather than to extract information for a particular user and send along the line information generated by the same, it will extract carriers from an output of the node and will re-insert them at an input giving access to another output.

Figure 3:
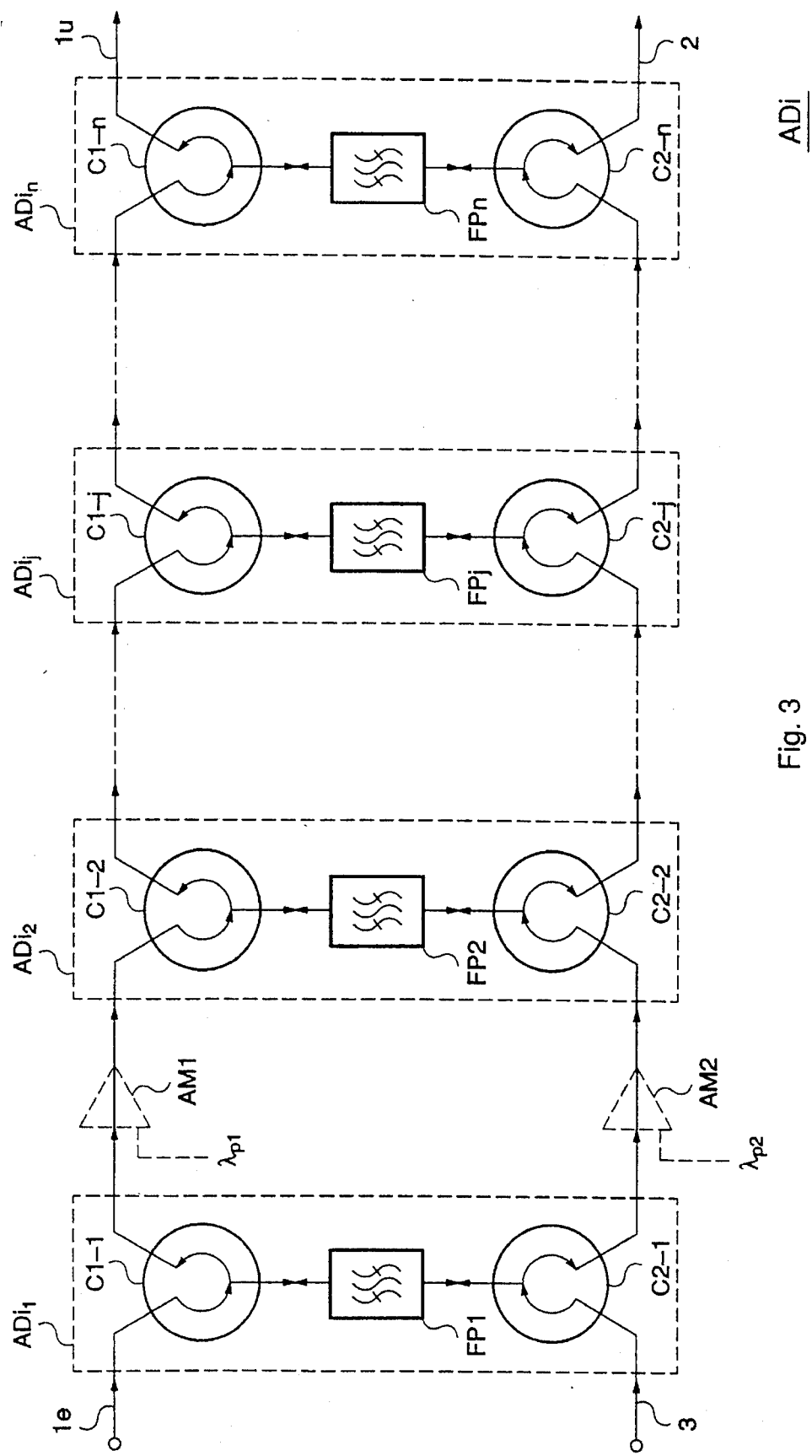
FIG. 3 is a diagram which depicts the device according to the invention, for extraction and re-insertion of several carriers at the same time.

FIG. 3 shows a cascade connection of several devices like device ADi in FIG. 2 to extract and re-insert several carriers at the same time, for instance carriers in the set $\lambda_1, \lambda_2 \ldots \lambda_n$ present on line 1 in FIG. 1.

Assuming the device should allow insertion and extraction of all the carriers, there will be a chain of n cells, $ADi_1$, $ADi_2 \ldots ADi_j \ldots ADi_n$, each tuned to one of the wavelengths of the set. C1–1 . . . C1–n, C2–1 . . . C2–n, and FP1 . . . FPn are the circulators and the tunable filters of the various cells. Since extraction and re-insertion operations carried out in the various cells inevitably cause losses, if cells are more than a certain number, optical amplifiers must be used to recover the level of the signal to be extracted or inserted. The Figure shows two active fiber optical amplifiers, AM1, AM2, inserted between circulators C1–1, C1–2 and C2–1, C2–2 of cells $ADi_1$, $ADi_2$, which receive the respective pump radiation $\lambda_{p1}, \lambda_{p2}$. Semiconductor amplifiers can also be used.

The operation of the system shown in FIG. 3 is clear from what was explained for FIG. 2. Assuming that the generic filter FPj is tuned to the wavelength with the same subscript, the generic carrier $\lambda_j$ present at input 1e propagates along the chain of circulators C1 until that of the j-th cell, and only at this cell it is transmitted from the filter to circulator C2j and from the latter to output 2 through the remaining circulators C2. The same applies to one of the carriers at the input 3. Of course, both inputs need not carry all the carriers (for ex., in an application as the one shown in FIG. 1, there will be only one carrier at input 3), nor all the carriers present at one input must be extracted or inserted: in such case, it suffices that one or more filters FP are not tuned to any of the set frequencies.

A device as the one described, besides being simple and easily implemented with commercially available components, has the advantage of high selectivity. Indeed, a preliminary evaluation carried out on a filter having spectral width in the order of a few Gigahertz, assuming that reflectivity of both mirrors of the cavity is essentially the same, shows that crosstalk is negligible when adjacent channels in the wavelength-division multiplex are spaced apart by a few tenths of nanometers. For comparison, the device using an acousto-optical filter described in the paper from Electronics Letters mentioned above requires, for carrier extraction and re-insertion, a channel spacing in the order of nanometers. Therefore, the invention allows implementation of transmission systems with many more channels in the same bandwidth.

It is clear that what described has been given only by way of non limiting example and that variations and modifications are possible without going out of the scope of the invention.

We claim:

1. A device for extraction of at least one optical carrier, modulated by an information signal, from a transmission line carrying an optical signal stream including several carriers at different wavelengths, and for reinsertion onto the line of the same carrier modulated by a different information signal, said device comprising:

at least a first three-port optical circulator with an input port connected to the line to receive an optical signal stream including a carrier to be extracted and an output port connected to the line to send along the line an optical signal stream including a carrier reinserted;

at least a second three-port optical circulator with an input port connected to means for generating a carrier to be reinserted, and an output port connected to means for receiving the carrier to be extracted; and at least a bandpass optical filter connected between an input-output port of the first circulator and an input-output port of the second circulator, said optical filter being a finely wavelength-tunable filter capable of transmitting the wavelength corresponding to the passband and reflect all other wavelengths, so as to transfer from the first circulator to the second circulator the carrier to be extracted, and from the second circulator to the first circulator the carrier to be reinserted, and to allow carriers at other wavelengths to pass from the input port to the output ports of the circulators.

2. The device defined in claim 1 wherein said filter is a resonant cavity optical fiber filter having means to adjust a cavity length for wavelength tuning.

3. The device defined in claim 1 which comprises a plurality of cells each of which is tuned to a different wavelength and comprises a first and a second circulator and a bandpass optical filter placed between an input-output port of the first circulator and an input-output port of the second circulator, said cells being connected so that the first and the second circulators are respectively cascaded, the first and second circulator of a first of said cells having an input port connected to the line and respectively means to generate the optical carriers to be reinserted and the first and the second circulators of a last of said cells having an output port connected to the line and respectively to means to receive the carriers extracted.

4. The device defined in claim 3 wherein between the first circulators and respectively between the second circulators of at least a pair of contiguous cells, optical amplifiers are provided to compensate the power losses introduced by the filters.

* * * * *